(12) United States Patent
Mishima (10) Patent No.: US 8,291,270 B2
(45) Date of Patent: Oct. 16, 2012

(54) REQUEST PROCESSING DEVICE, REQUEST PROCESSING SYSTEM, AND ACCESS TESTING METHOD

(75) Inventor: Masahiro Mishima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 303 days.

(21) Appl. No.: 12/608,293

(22) Filed: Oct. 29, 2009

(65) Prior Publication Data

US 2010/0146224 A1    Jun. 10, 2010

(30) Foreign Application Priority Data

Dec. 5, 2008   (JP) .................................. 2008-311498

(51) Int. Cl.
*G11C 29/12*   (2006.01)
*G06F 12/00*   (2006.01)

(52) U.S. Cl. .......................... 714/718; 711/154; 714/719

(58) Field of Classification Search ........................ None
See application file for complete search history.

(56) References Cited

U.S. PATENT DOCUMENTS

| | | | | |
|---|---|---|---|---|
| 5,469,443 A * | 11/1995 | Saxena | ........................... | 714/720 |
| 5,640,509 A * | 6/1997 | Balmer et al. | ................... | 714/42 |
| 5,815,509 A * | 9/1998 | Deng et al. | ..................... | 714/719 |
| 7,546,497 B2 * | 6/2009 | Jang | ............................... | 714/718 |
| 7,725,795 B2 * | 5/2010 | Sugano | ........................ | 714/743 |

FOREIGN PATENT DOCUMENTS

| | | |
|---|---|---|
| JP | 5-342111 | 12/1993 |
| JP | 2001-67274 | 3/2001 |
| JP | 2005-182263 | 7/2005 |

OTHER PUBLICATIONS

Chinese Office Action issued Jan. 31, 2012 in corresponding Chinese Patent Application No. 200910226389.0.

* cited by examiner

*Primary Examiner* — Gary Portka
(74) *Attorney, Agent, or Firm* — Staas & Halsey LLP (57) ABSTRACT

A request processing device includes a request sender that sends a write request or a read request to a storage device, a response processor that receives a response to a request which the request sender has sent, and a test request processor that converts a read response which is a response to a read request, into a test write request, and converts a write response which is a response to a write request into a test read request, from among responses that the response processor has received or from among responses that have been input from a device which is provided outside the request processing device.

9 Claims, 9 Drawing Sheets

REQUEST PROCESSING DEVICE, REQUEST PROCESSING SYSTEM, AND ACCESS TESTING METHOD

CROSS-REFERENCE TO RELATED APPLICATIONS

This application is based upon and claims the benefit of priority of the prior Japanese Patent Application No. 2008-311498, filed on Dec. 5, 2008, the entire contents of which are incorporated herein by reference.

FIELD

Embodiments discussed herein relate to an access test technology in a request processing device and a request processing system for relaying a request and a response for access and controlling access to a storage device in order to read/write data from/into the storage device.

BACKGROUND

When a computer system is designed or set up, verification of various types of operations is performed. For example, in a computer system having a central processing unit (CPU) or a processor, an input/output (I/O) device and a memory, a method in which a test program is executed by the CPU to generate memory access has been utilized for performing verification of a dual inline memory module (DIMM) and a memory access control section.

Furthermore, a test circuit is also known which performs memory access in order to access a specified address without execution of an instruction using a CPU, thereby verifying an operation.

Similarly, a test circuit is known that performs verification of an operation of an interface that is operating as a single device for verifying an external interface. As one example, a test circuit is known in which an output terminal of an interface is connected to an input terminal thereof to form a return path for testing a serial interface circuit. In such circuit, a test pattern is generated by a test pattern generating unit at the output terminal when the test is performed, and an operation check is performed by a matching circuit for matching of the test pattern at the input terminal.

These test circuits performs verification of a memory or a circuit without setting up a system after all peripheral devices are connected to the system in a practical manner, and without running a test program on the system.

Technologies related to tests are disclosed in the following documents: Japanese Unexamined Patent Application Publication No. 2005-182263; Japanese Unexamined Patent Application Publication No. 5-342111; and Japanese Unexamined Patent Application Publication No. 2001-67274.

In order to satisfy demand for higher performance in recent years, the configuration of systems has become complicated. Accordingly, reduction of a time taken to perform system verification is required to reduce a development time. In order to realize setting up of such a system which is complicated and whose development time is short, it is required to perform various types of verification on the system at a step before other peripheral devices are connected to the system.

However, in a case in which various types of operation tests are performed using the above-mentioned test circuits on the system at a step before other peripheral devices are connected to the system, as the number of memory addresses to be tested or the number of test patterns is increased, the configuration and circuit scale of the system are increased. Accordingly, there is a problem that a fundamental advantage that testing can be easily performed is lost.

Realization of a technology for performing, with a simple mechanism, various types of verification on system elements that exist in a wider area is an important issue. More particularly, in a server device in which a plurality of CPUs is mounted, the configuration of a system is complicated, and it takes a long time to perform verification when the system is set up. Accordingly, how to easily perform various types of tests at a step before the CPUs are connected to the system is important.

Embodiments of the present invention are made to solve the above-described issues.

SUMMARY

According to embodiment, a request processing device includes a request sender that sends a write request or a read request to a storage device, a response processor that receives a response to a request which the request sender has sent, and a test request processor that converts a read response, which is a response to a read request, into a test write request, and converts a write response which is a response to a write request into a test read request, from among responses that the response processor has received or from among responses that have been input from a device which is provided outside the request processing device.

The above-described embodiments of the present invention are intended as examples, and all embodiments of the present invention are not limited to including the features described above.

DETAILED DESCRIPTION OF THE PREFERRED EMBODIMENTS

Reference may now be made in detail to embodiments of the present invention, examples of which are illustrated in the accompanying drawings, wherein like reference numerals refer to like elements throughout.

Hereinafter, embodiments of the present invention will be described in detail with reference to the drawings.

Figure 1:
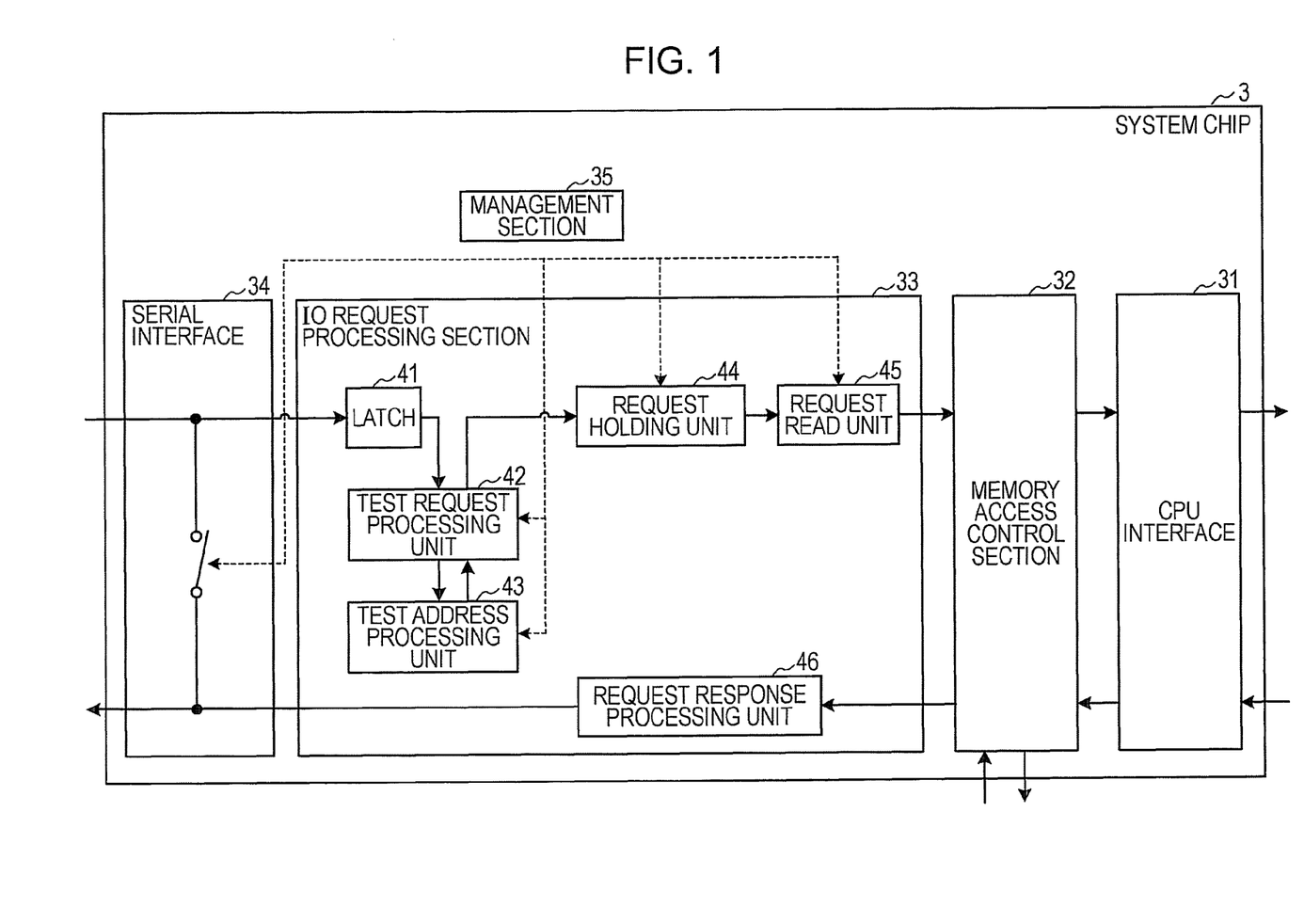
FIG. 1 illustrates a configuration of a system chip according to an embodiment.
Figure 2:
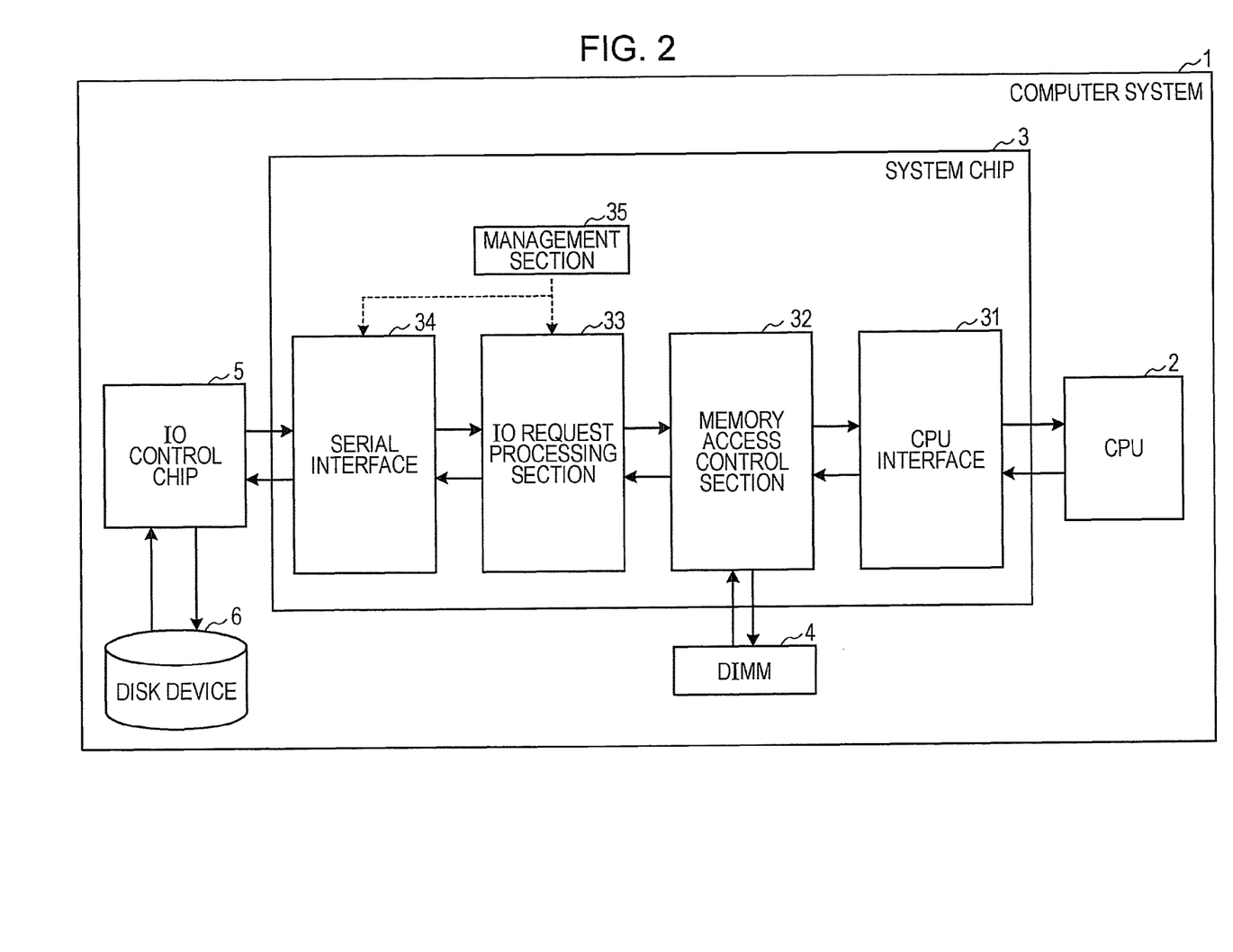
FIG. 2 illustrates a configuration of a computer system according to the present embodiment.

FIG. 1 is a diagram illustrating a configuration of a system chip according to an embodiment. As an example, the system chip is a request processing system including an IOrequest processing section which is a request processing device. FIG. 2 is a diagram illustrating a configuration of a computer system having the system chip.

As illustrated in FIG. 2, a computer system 1 includes a CPU 2, a system chip 3, a DIMM (Direct Inline Memory Module) 4, an IO (Input/Output) control chip 5, and a disk device 6. The CPU 2 is an arithmetic processing device that performs arithmetic processes, and uses the DIMM 4 as the main memory. Furthermore, the disk device 6 is an auxiliary storage device that is a hard disk drive (HDD) for example. The IO control chip 5 performs a process of controlling inputting data to or outputting data from to the disk device 6.

The system chip 3 exists among the CPU 2, the DIMM 4, and the IO control chip 5. The system chip 3 is a circuit that relays a request and a response for access and that controls access to the DIMM 4, which is a memory, or to the disk device 6. The system chip 3 has a serial interface 34, an IO request processing section 33, a memory access control section 32, a CPU interface 31, and a management section 35 there inside.

The serial interface 34 is an interface having a serial connection with the IO control chip 5. The IO request processing section 33 is connected to the IO control chip 5 via the serial interface 34, and processes an input/output request from the disk device 6.

Furthermore, the CPU interface 31 is an interface that is connected to the CPU 2. The memory access control section 32 is an interface that is connected to the DIMM 4. The memory access control section 32 controls access from the CPU 2 to the DIMM 4 via the CPU interface 31, and access from the disk device 6 to the DIMM 4 via the IO request processing section 33, the serial interface 34, and the IO control chip 5.

The management section 35 is a processing section that performs setting for an operation of the IO request processing section 33. The IO request processing section 33 operates in two operation modes, i.e., a normal mode and a test mode. The operation mode of the IO request processing section 33 can be switched by the management section 35. Furthermore, the management section 35 specifies the details of an operation of the IO request processing section 33 in the test mode.

In an operation in the normal mode, the IO request processing section 33 relays, to the memory access control section 32, a request to the DIMM 4 that is input from the serial interface 34, without processing the request. The request to the DIMM 4 includes a store request which is a request to write data into the DIMM 4, and a fetch request which is a request to read data from the DIMM 4.

The memory access control section 32 processes a store request or a fetch request that has been received from the IO request processing section 33, and returns a process result as a response to the IO request processing section 33. The IO request processing section 33 that is operating in the normal mode relays the response that has been input from the memory access control section 32 to the serial interface 34, without processing the response.

An operation in the test mode will be described with reference to FIG. 3. In the operation in the test mode, the memory access control section 32 makes a response to a request that the IO request processing section 33 made, and the response is converted into another request. The converted request is sent to the memory access control section 32.

Figure 3:
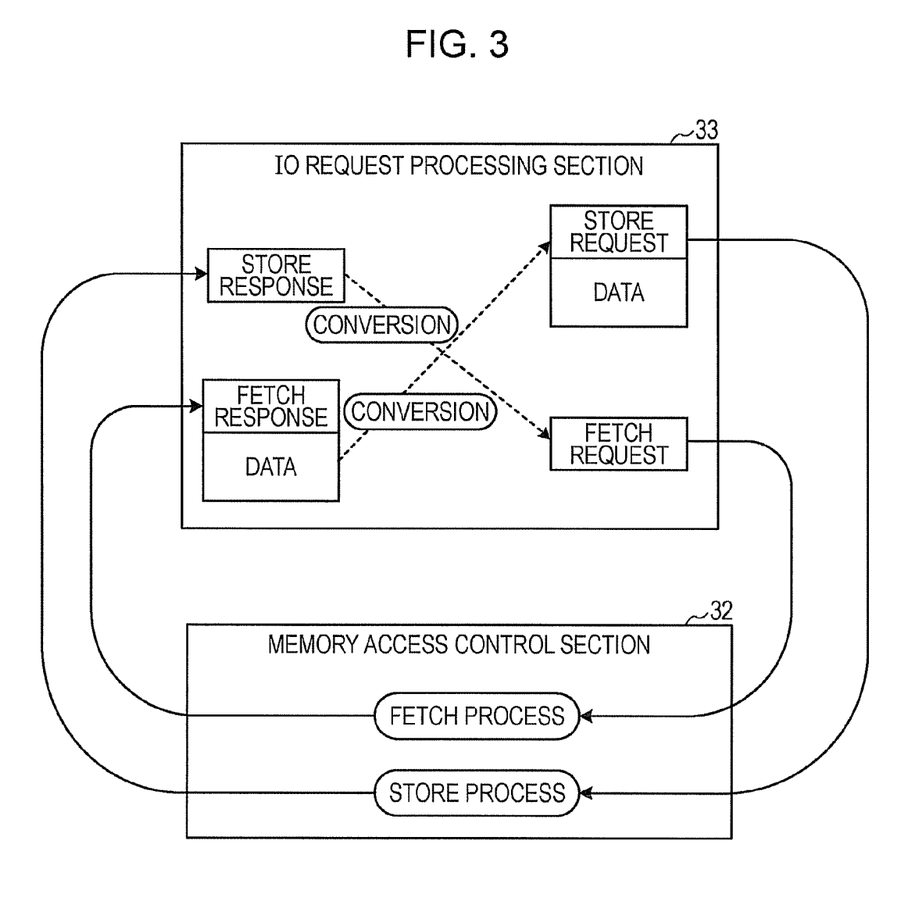
FIG. 3 illustrates an operation in a test mode.

As illustrated in FIG. 3, the IO request processing section 33 converts a store response into a fetch request, and sends the fetch request to the memory access control section 32. Furthermore, the IO request processing section 33 converts the fetch response from the memory access control section 32 into a store request, and sends the store request to the memory access control section 32. When the fetch response is converted into the store request, a data portion of the fetch response, e.g., the contents of data that is read from an address which is specified in the fetch request, is used as a data portion of the store request, e.g., the contents of data that is to be written into an address which is specified in the store request.

In this manner, the memory access control section 32 also processes a store request or a fetch request that is generated by a conversion process performed by the IO request processing section 33 as in the case in which the memory access control section 32 operates in the normal mode. The memory access control section 32 then returns a response corresponding to a process result to the IO request processing section 33. Then, the IO request processing section 33 converts the received response into another request.

Accordingly, in the system chip 3 that is operating in the test mode, a request and a response are repeated between the IO request processing section 33 and the memory access control section 32, and memory access continues until the test mode is terminated.

Referring back to FIG. 1, a configuration of the system chip 3 for realizing the operation in the test mode will be described. As illustrated in FIG. 1, the IO request processing section 33 has a latch 41, a test request processor 42, a test address processor 43, a request holding unit 44, a request read unit 45 and a request response processor 46 there inside.

The latch 41 temporarily holds a packet that is inputted from the serial interface 34. While the system chip 3 is operating in the normal mode, a packet that the latch 41 holds, i.e., a packet that is input from the serial interface 34, is provided as a request from the IO control chip 5. While the system chip 3 is operating in the normal mode, the test request processor 42 sends the request that is held in the latch 41 to the request holding unit 44 without processing the request.

On the other hand, while the system chip 3 is operating in the test mode, a packet that the latch 41 holds is provided as a response to a request that was sent from the IO request processing section 33 before. While the system chip 3 is operating in the test mode, the test request processor 42 converts the response that is held in the latch 41 into a request if necessary, and sends the request to the request holding unit 44.

In other words, the test request processor 42 operates only in the test mode to convert a response packet into a request packet. The operation mode of the test request processor 42 is switched between the normal mode or the test mode by the management section 35 as already described.

When the test request processor 42 performs conversion of a packet, the test address processor 43 specifies the details of conversion of an address portion of the packet to be converted. The test address processor 43 has three address registers (not illustrated). That is, the three address registers are an OVL_ADRS that holds a test address, an END_ADRS for determining the upper limit of the test address, which is an end address, and a START_ADRS for determining the lower limit of the test address, that is a start address.

Every time the test address processor 43 is instructed by the test request processor 42 to update the test address, the test address processor 43 increments the test address in the OVL_ADRS. When the value of the test address in the OVL_ADRS has reached the value of the end address in the END_ADRS, the test address processor 43 resets the test address in the OVL_ADRS to be the value of the start address in the START_ADRS. Before a test starts, the start address, the end address and the test address are set by the management section 35 in the START_ADRS, the END_ADRS, and the OVL_ADRS of the serial interface 34, respectively. In other words, while the system chip 3 is operating in the test mode, the serial interface 34 repeatedly specifies an address range that is set using the start address and the end address by the management section 35.

The request holding unit 44 temporarily holds one request or a plurality of requests that are sent from the test request processor 42. The request holding unit 44 always holds a request, because sending of a request from the test request processor 42 is performed even when the system chip 3 is operating in the normal mode or operating in the test mode.

The request read unit 45 reads a request that the request holding unit 44 holds, and outputs the request to the memory access control section 32.

The request response processor 46 receives a response to a request from the memory access control section 32. The request response processor 46 temporarily stores the response, and outputs the response to the serial interface 34. In a case in which the request response processor 46 outputs the response that has been received from the memory access control section 32, the request response processor 46 performs protocol conversion if protocol conversion is necessary.

When the system chip 3 operates in the test mode, the response that the request response processor 46 has received is supplied to the test request processor 42. Accordingly, in an example illustrated in FIG. 3, a return path in which a response that the IO request processing section 33 has outputted is returned to the latch 41 of the IO request processing section 33 without being processed is provided in the serial interface 34.

An operation using the return path is controlled by the management section 35, and the return path is enabled only in the test mode. In other words, the serial interface 34 has the two operation modes, i.e., the test mode and the normal mode. When the serial interface 34 operates in the test mode, the serial interface 34 functions as a return input section that returns a response to the IO request processing section 33.

A configuration in a case in which a response from the IO request processing section 33 is retuned in the serial interface 34 is described as an example. However, the IO request processing section 33 may have a return path there inside. Alternatively, a configuration may be used, in which, outside the system chip 3, an output terminal of the serial interface 34 is connected to an input terminal of the serial interface 34 so that a response can be returned.

Figure 4:
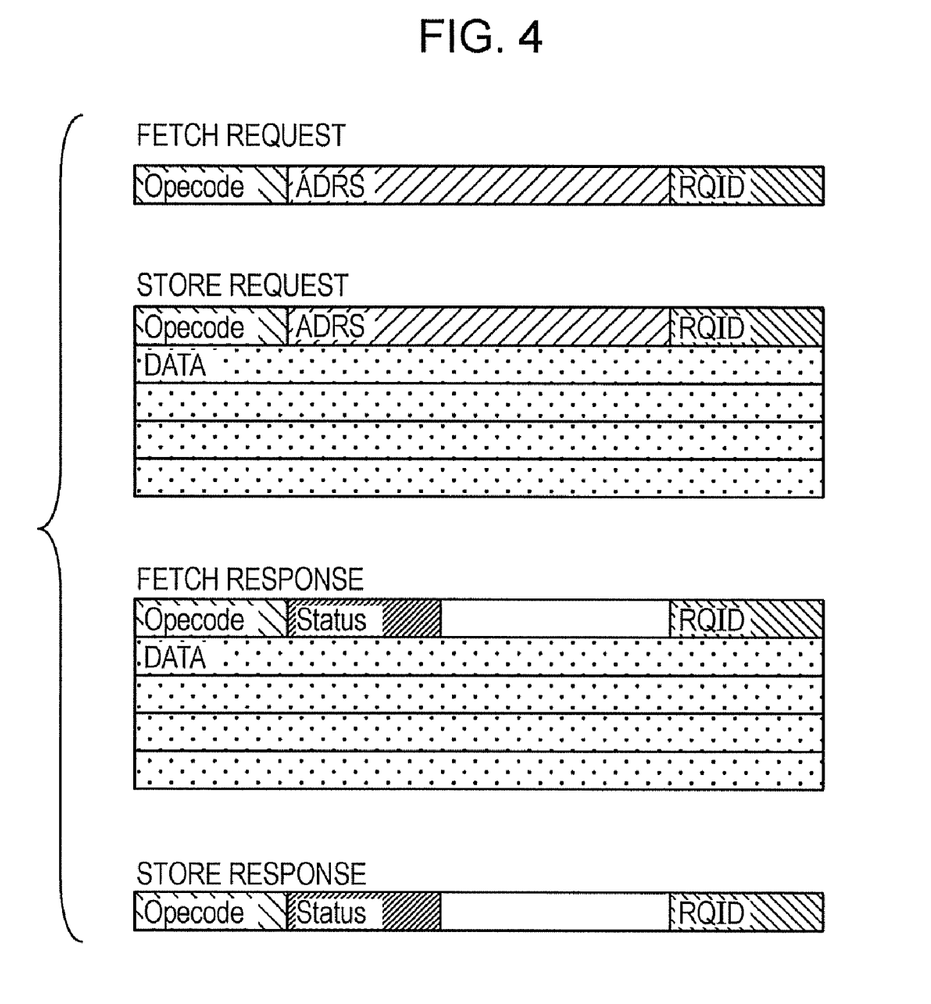
FIG. 4 illustrates formats of a request packet and a response packet.

FIG. 4 illustrates formats of a request packet and a response packet. A packet provided as a fetch request has an Opecode field showing a type of packet, in which information indicating that the packet is provided as a fetch request is stored. Further, the packet provided as a fetch request has an ADRS field in which an address from which data is to be read is stored, and an RQID field in which an identifier for identifying and managing the packet is stored.

A packet provided as a store request has an Opecode field showing a type of packet, in which information indicating that the packet is provided as a store request is stored. Further, the packet provided as a store request has an ADRS field in which an address into which data is to be written is stored, an RQID field in which an identifier for identifying and managing the packet is stored, and a DATA filed in which data to be written is stored.

A packet provided as a fetch response has an Opecode field showing a type of packet, in which information indicating that the packet is provided as a fetch response is stored. Further, the packet provided as a fetch response has a Status field for recognizing an error response, an address exception, and so forth, an RQID field in which an identifier for identifying and managing the packet is stored, and a DATA field in which data that has been read is stored.

Furthermore, a packet provided as a store response has an Opecode field showing a type of packet, in which information indicating that the packet is provided as a store response is stored. Further, the packet provided as a fetch response has a Status field for recognizing an error response, an address exception, and so forth, and an RQID field in which an identifier for identifying and managing the packet is stored.

Note that each of the packet provided as a fetch request and the packet provided as a store response is sent and received in one cycle. On the other hand, regarding each of the packet provided as a store request and the packet provided as a fetch response, five cycles are necessary to send and receive the entire packet because four cycles are used to send and receive the DATA field.

Figure 5:
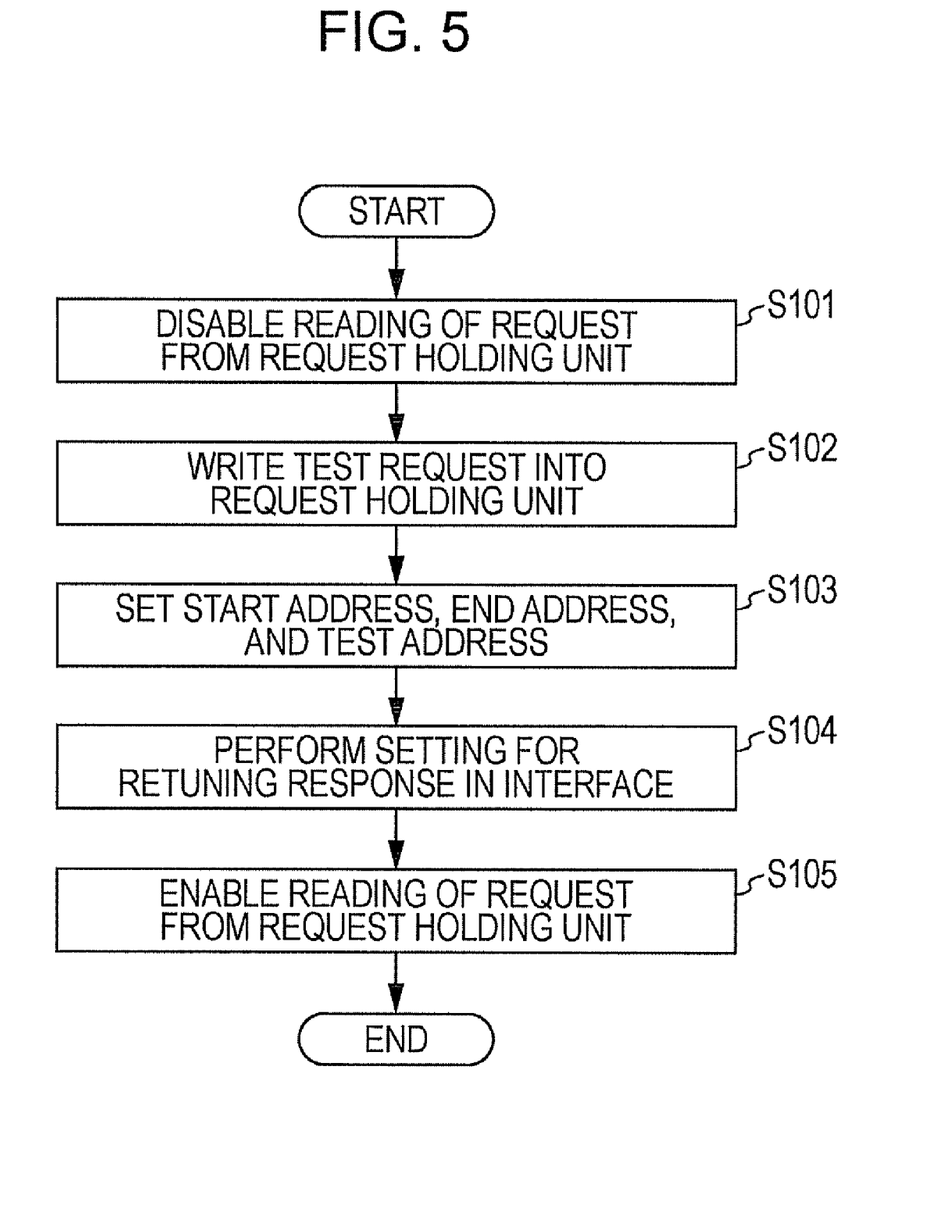
FIG. 5 is a flowchart illustrating an operation of starting the test mode, which is performed by a management section.

Next, an operation of starting the test mode, which is performed by the management section 35, will be described with reference to FIG. 5. As illustrated in FIG. 5, first, the management section 35 controls the request read unit 45 to disable reading of a request from the request holding unit 44 (S101). With the control of disabling reading of a request, access to the memory is stopped.

Next, the management section 35 writes a test request into the request holding unit 44 (S102). The written test request indicates details of a first request in the test mode, and may be a fetch request or a store request. Furthermore, the management section 35 sets the start address, the end address and the test address in the START_ADRS, the END_ADRS and the OVL_ADRS of the test address processor 43, respectively (S103). Furthermore, the management section 35 performs setting for returning a response in the serial interface 34 (S104). Note that, a case in which the serial interface 34 has a return path there inside, and the management section 35 controls the serial interface 34 is supposed herein. However, in a configuration in which a return path is provided inside the IO request processing section 33, the management section 35 sets the return path, which is provided inside the IO request processing section 33, to be enabled. Furthermore, in a case in which terminals are to be connected to each other outside the system chip 3, an operator directly will connect the terminals to each other. Note that the order of the processes in S102 to S104 can be appropriately changed.

Then, the management section 35 controls the request read unit 45 to enable reading of a request from the request holding unit 44 (S105), and terminates the process. With enabling of reading a request, the request read unit 45 reads a request from the request holding unit 44, and outputting of a request from the IO request processing section 33 starts, and the system chip 3 operates in the test mode.

Figure 6:
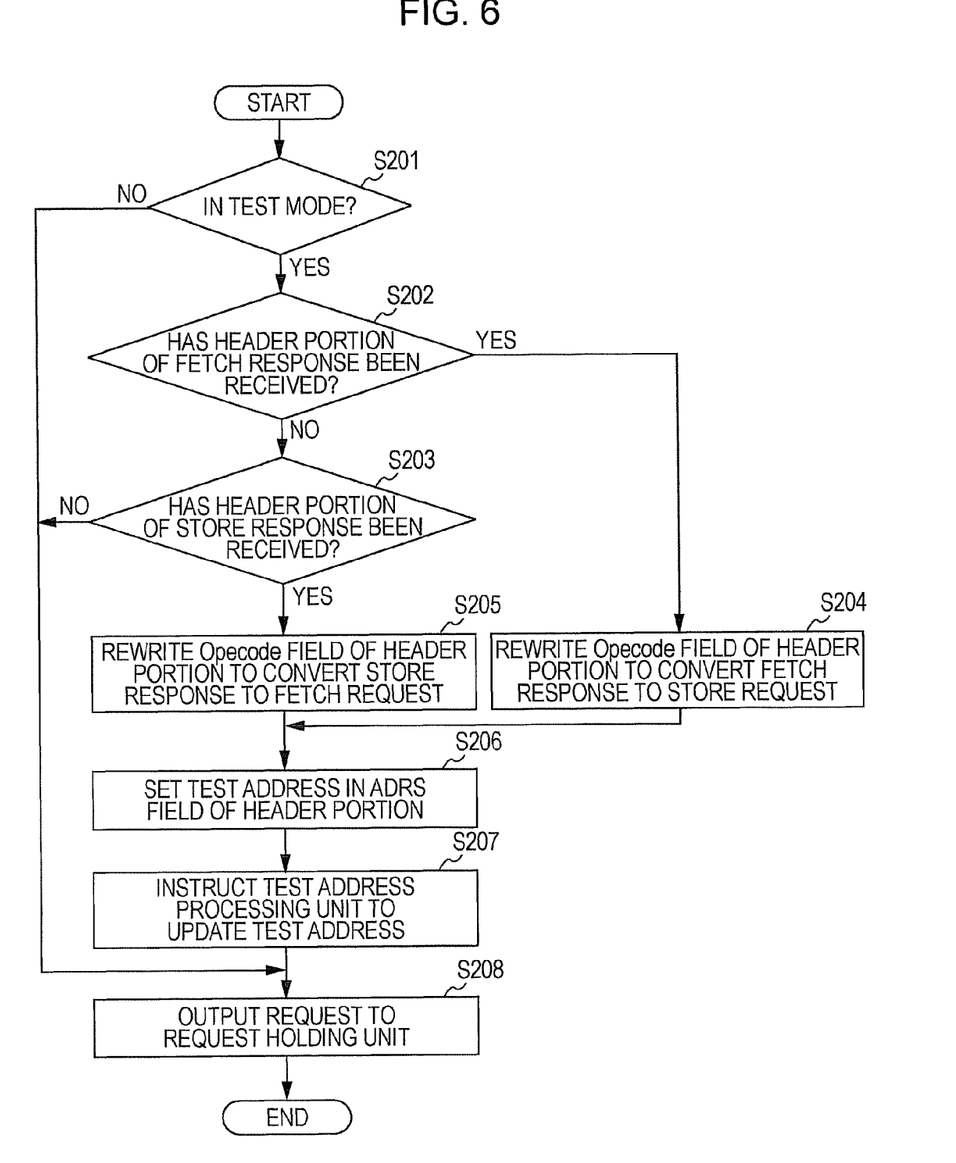
FIG. 6 is a flowchart illustrating a processing operation that is performed by a test request processor.

Next, a processing operation that is performed by the test request processor 42 will be described with reference to FIG. 6. First, the test request processor 42 checks whether or not the operation mode is the test mode (S201). When the operation mode is not the test mode (No in S201), the test request processor 42 outputs a packet that is read from the latch 41 to the request holding unit 44, without processing the packet (S208), and terminates the process.

In contrast, when the system chip 3 is operating in the test mode (Yes in S201), the test request processor 42 determines whether or not the contents of a packet that is held in the latch 41 are a header portion of a fetch response (S202). When the contents of a packet that is held in the latch 41 are a header portion of a fetch response (Yes in S202), the test request processor 42 rewrites the Opecode field of the header portion of the fetch response to convert the fetch response into a store request (S204).

When the contents of a packet that is held in the latch 41 are not a header portion of a fetch response (No in S202), the test request processor 42 determines whether or not the contents of the packet that is held in the latch 41 are a header portion of a store response (S203). As a result, when the contents of the packet that is held in the latch 41 are not a header portion of a store response either (No in S203), the test request processor 42 outputs the packet that is read from the latch 41 to the request holding unit 44, without processing the packet (S208), and terminates the process.

In contrast, when the contents of the packet that is held in the latch 41 are a header portion of a store response (Yes in S203), the test request processor 42 rewrites the Opcode field of the header portion of the store response to convert the store response into a fetch request (S205).

After the test request processor 42 rewrites the Opcode field of the header portion, the test request processor 42 sets the test address (in the OVL_ADRS), which the test address processor 43 holds, in the ADRS field of the header portion (S206), and instructs the test address processor 43 to update the test address (S207).

Then, the test address processor 43 outputs the request that has been generated by conversion of the response to the request holding unit 44 (S208), and terminates the process.

Figure 7:
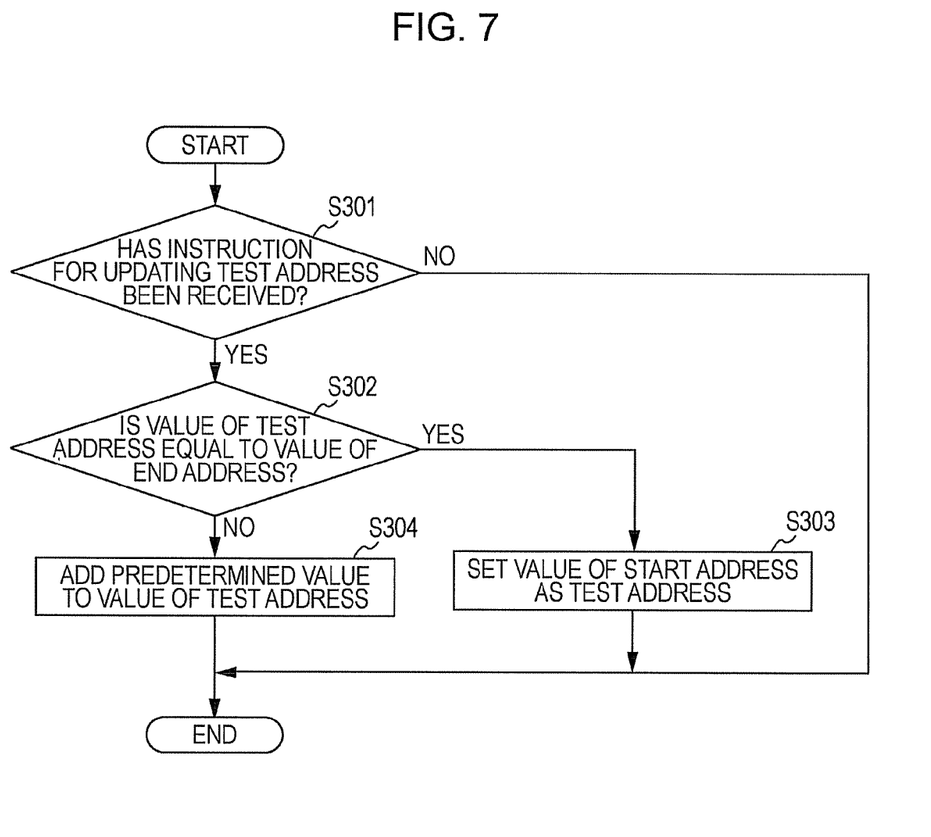
FIG. 7 is a flowchart illustrating a process of updating a test address, which is performed by a test address processor.

A process of updating the test address, which is performed by the test address processor 43, will be described with reference to FIG. 7. As illustrated in FIG. 7, when the test address processor 43 has not received an instruction for updating the test address from the test request processor 42 (No in S301), the test address processor 43 terminates the process. In contrast, when the test address processor 43 has received an instruction for updating the test address from the test request processor 42 (Yes in S301), the test address processor 43 compares the value of the test address in the OVL_ADRS with the value of the end address in the END_ADRS (S302).

As a result, when the value of the test address in the OVL_ADRS is equal to the value of the end address in the END_ADRS (Yes in S302), the test address processor 43 sets the value of the start address in the START_ADRS as the test address in the OVL_ADRS (S303), and terminates the process. In contrast, when the value of the test address in the OVL_ADRS is not equal to the value of the end address in the END_ADRS (No in S302), the test address processor 43 adds a predetermined value to the value of the test address in the OVL_ADRS, and terminates the process.

Figure 8:
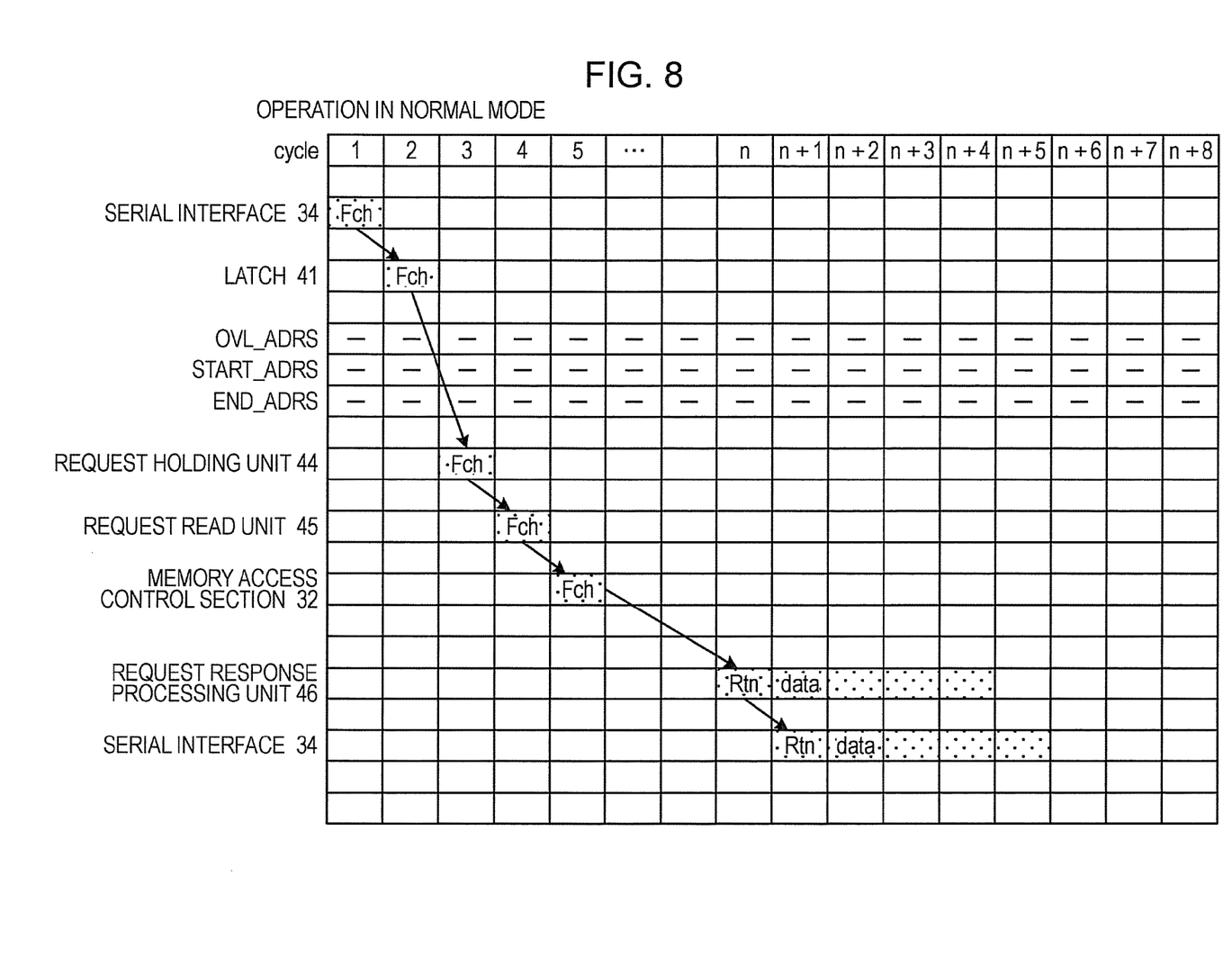
FIG. 8 illustrates an operation in a normal mode.

FIG. 8 is an explanatory diagram for explaining the operation in the normal mode. A fetch request (Fch) that the serial interface 34 holds in a first cycle is moved to and held in the latch 41 in a second cycle. Then, in a third cycle, the fetch request is moved to and held in the request holding unit 44. In a fourth cycle, the fetch request is moved to and held in the request read unit 45.

In a fifth cycle, the fetch request is moved to and processed by the memory access control section 32, and a fetch response is returned.

More specifically, in an n-th cycle, the request response processor 46 receives a header portion (Rtn) of the fetch response. In an (n+1)-th cycle to an (n+4)-th cycle, the request response processor 46 receives a data portion (data) of the fetch response. Then, in the (n+1)-th cycle, the test address processor 43 receives the header portion of the fetch response. In the (n+2)-th cycle to an (n+5)-th cycle, the serial interface 34 receives the data portion of the fetch response.

Note that, in the operation in the normal mode, the test address in the OVL_ADRS, the end address in the END_ADRS and the start address in the START_ADRS are not used.

Figure 9:
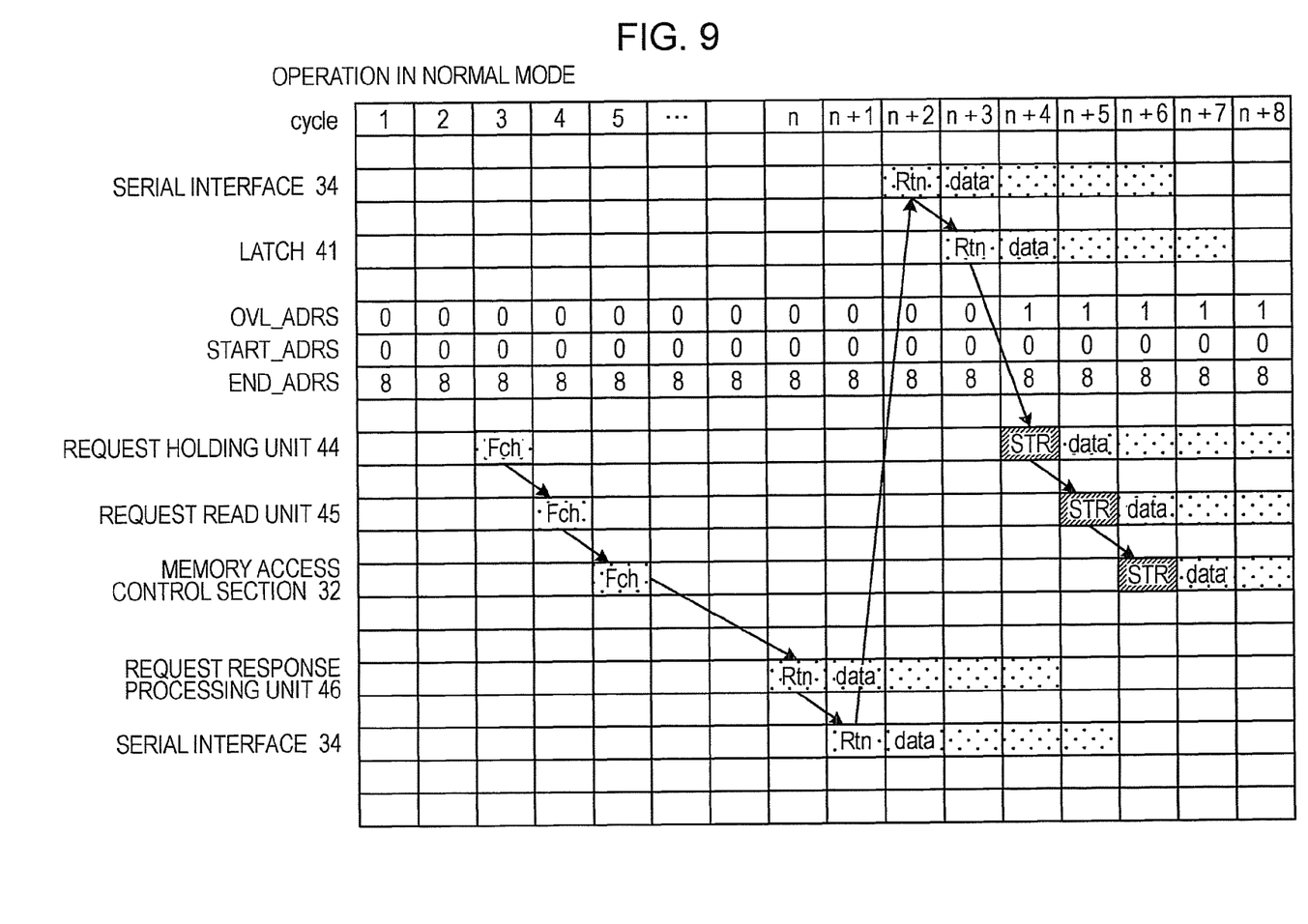
FIG. 9 illustrates the operation in the test mode.

FIG. 9 is an explanatory diagram for explaining the operation in the test mode. In the test mode, a state in which a request is held in the request holding unit 44 is an initialization state. Furthermore, in the initialization state, it is supposed that "zero" is set as the test address in the OVL_ADRS, "eight" is set as the end address in the END_ADRS and "zero" is set as the start address in the START_ADRS of the test address processor 43. Note that, in FIG. 9, in order to distinguish the differences between FIG. 8 and FIG. 9 from each other, the operation starts in a third cycle.

A fetch request (Fch) that the request holding unit 44 holds in a third cycle is moved to and held in the request read unit 45 in a fourth cycle. Then, in a fifth cycle, the fetch request is moved to and processed by the memory access control section 32, and a fetch response is returned.

In an n-th cycle, the request response processor 46 receives a header portion (Rtn) of the fetch response. In an (n+1)-th cycle to an (n+4)-th cycle, the request response processor 46 receives a data portion (data) of the fetch response. Then, in the (n+1)-th cycle, the test address processor 43 receives the header portion of the fetch response. In the (n+2)-th cycle to an (n+5)-th cycle, the serial interface 34 receives the data portion of the fetch response.

In the normal mode illustrated in FIG. 8, the serial interface 34 sends a response to the outside. However, in the test mode illustrated in FIG. 9, a response is retuned, and transmitted to a sending side. In the (n+2)-th cycle, a sending side of the serial interface 34 holds the header portion of the fetch response. In the (n+3)-th cycle to an (n+6)-th cycle, the sending side of the serial interface 34 holds the data portion of the fetch response.

Accordingly, in the (n+3)-th cycle, the latch 41 holds the header portion of the fetch response. In the (n+4)-th cycle to an (n+7)-th cycle, the latch 41 holds the data portion of the fetch response.

The test request processor 42 rewrites the header portion of the fetch response, which the latch 41 holds in the (n+3)-th cycle, to convert the fetch response into a store request (STR), and sends the store request to the request holding unit 44. When rewriting is performed, an address in which data is to be stored is "zero" that is the value of the test address. Then, the test address processor 43 is instructed by the test request processor 42 to update the test address. In the (n+4)-th cycle, the test address processor 43 updates the value of the test address in the OVL_ADRS to be "one".

Furthermore, the data portion of the fetch response, which is held in the latch 41 in the (n+4)-th cycle to the (n+7)-th cycle, is sent to the request holding unit 44 without being processed.

Accordingly, in the (n+4)-th cycle, the request holding unit 44 holds a header portion of the store request. In the (n+5)-th cycle to an (n+8)-th cycle, the request holding unit 44 holds a data portion of the store request, and the data portion is treated as data, which is to be written in the store request.

Then, in the (n+5)-th cycle, the request read unit 45 holds the header portion of the store request. In the (n+6)-th cycle to an (n+9)-th cycle, the request read unit 45 holds the data portion of the store request. In the (n+6)-th cycle, the memory access control section 32 receives the header portion of the store request. In the (n+7)-th cycle to an (n+10)-th cycle, the memory access control section 32 receives the data portion of the store request.

As described above, the system chip 3 according to the present embodiment has the test mode that is an operation mode for testing. In the test mode, the system chip 3 returns a response to a request, and converts the response into a new request, thereby reusing a data portion of the response. Accordingly, access test can be easily and efficiently performed on the memory without dependence on a state in which other system elements such as the CPU are mounted.

Furthermore, when a response to a request is converted into a new request, an address range is specified using the address registers. Accordingly, access to a wide range of memory addresses can be realized with a small number of requests.

In addition, when the system chip 3 according to the present embodiment operates in the test mode, the system chip 3 uses the same circuit used in the normal operation, and processes the same requests that are used in a practical operation. Accordingly, the system chip 3 can perform verification and testing of not only an operation of the memory that is operating as a single device but also of an operation of the entire circuit.

Moreover, even when the system chip 3 operates in the test mode, the state of check functions for data and protocols, which are performed by each of the control sections in the normal operation, is held so that the check functions are enabled, whereby the system chip 3 can guarantee, using the check functions, that access for writing and reading data is correctly performed in the test mode. Regarding examples of the check functions, whether or not data that is read from the DIMM 4 is correct can be checked using a check function with error correction code (ECC) that was generated when the data was written into the DIMM 4. Whether or not data that is input from the serial interface 34 is correct can be checked using a check function with cyclic redundancy check (CRC) that was performed when the data was output to the serial interface 34.

Additionally, the system chip 3 according to the present embodiment specifies an address range to be accessed, and can semi-permanently continue accessing the range. Accordingly, the system chip 3 can perform a long-duration test of memory access without using the CPU. Note that, when the system chip 3 changes or checks a setting for the start address, the end address, data to be written or read, or the like, it is only necessary that the system chip 3 perform the processes in the flowchart illustrated in FIG. 5 again. When the system chip 3 disables reading of a request from the request holding unit 44 and waits a fixed time, all requests that were being processed have been processed, and access is stopped while a request is being held in the request holding unit 44. Thus, no side effect that is caused by the request holding unit 44 that operates while the setting is being changed occurs.

Furthermore, a test program is generated at the CPU side under the assumption that access conflict occurs, whereby a long-duration test can be performed in a more complicated state in which conflict between access from the CPU 2 and access from the IO control chip 5 is considered.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A request processing device comprising:
   a transmitter that transmits a write request or a read request to a storage device;
   a receiver that receives a response to a request which the transmitter has sent; and
   a processor that reuses a read response which is a response to a read request as a test write request by converting the read response into the test write request, and reuses a write response which is a response to a write request as a test read request by converting the write response into the test read request, from among responses that the receiver has received or from among responses that have been input from a device which is provided outside the request processing device.

2. The request processing device according to claim 1, wherein the processor is capable of operating in two operation modes, which are a test mode and a normal mode, and
   when the processor operates in the test mode, the processor selectively performs conversion of the read response into a test write request and conversion of the write response into a test read request.

3. The request processing device according to claim 1, wherein the processor rewrites an Opecode field that the write response or a packet of the write response has, and performing the conversion.

4. The request processing device according to claim 1, further comprising a test address processor that specifies a write address in the test write request and a read address in the test read request.

5. The request processing device according to claim 4, wherein the test address processor repeatedly specifies an address range that is specified in advance.

6. A request processing system comprising:
   a transmitter that transmits a write request or a read request to a storage device;
   a receiver that receives a response to a request which the transmitter has sent; and
   a processor that, from among responses that the receiver has received, reuses a read response which is a response to a read request as a test write request by converting the read response into the test write request, and reuses a write response which is a response to a write request as a test read request by converting the write response into the test read request.

7. The request processing system according to claim 6, further comprising a return input unit that has two operation modes, which are a test mode and a normal mode, and that, when the return input unit operates in the test mode, returns and inputs a response which the receiver has received to the processor,
   wherein the processor has two operation modes, which are a test mode and a normal mode, and, in the test mode, the processor selectively performs conversion of the read response into a test write request and conversion of the write response into a test read request.

8. The request processing system according to claim 6, further comprising a test management unit that manages at least the details of an operation which is performed by the processor.

9. An access testing method for testing access to a storage device, the method comprising:
   transmitting a write request or a read request to a storage device;
   receiving a response to a request that has been sent;
   reusing, when a response that has been received is a read response which is a response to the read request, the read response as a test write request by converting the read response into the test write request, and reusing, when the response that has been received is a write response which is a response to the write request, the write response as a test read request by converting the write response into the test read request; and
   transmitting the test write request or the test read request to the storage device.

\* \* \* \* \*